(12) United States Patent
Gross

(10) Patent No.: US 10,899,653 B2
(45) Date of Patent: Jan. 26, 2021

(54) ION-EXCHANGEABLE GLASS WITH LOW COEFFICIENT OF THERMAL EXPANSION

(71) Applicant: CORNING INCORPORATED, Corning, NY (US)

(72) Inventor: Timothy Michael Gross, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 40 days.

(21) Appl. No.: 15/863,054

(22) Filed: Jan. 5, 2018

(65) Prior Publication Data

US 2018/0194670 A1    Jul. 12, 2018

Related U.S. Application Data

(60) Provisional application No. 62/443,918, filed on Jan. 9, 2017.

(51) Int. Cl.
| | | |
|---|---|---|
| *C03C 3/097* | (2006.01) | |
| *C03C 3/087* | (2006.01) | |
| *C03C 4/18* | (2006.01) | |
| *G06F 1/16* | (2006.01) | |
| *C03C 21/00* | (2006.01) | |

(52) U.S. Cl.
CPC ............. *C03C 3/097* (2013.01); *C03C 3/087* (2013.01); *C03C 4/18* (2013.01); *C03C 21/002* (2013.01); *G06F 1/1616* (2013.01); *G06F 1/1626* (2013.01); *C03C 2204/00* (2013.01)

(58) Field of Classification Search
CPC ....... C03C 3/087; C03C 3/097; C03C 21/002; C03C 4/18; C03C 2204/00; G06F 1/1616; G01F 1/1626
See application file for complete search history.

(56) References Cited

U.S. PATENT DOCUMENTS

| | | |
|---|---|---|
| 2005/0042012 A1 | 2/2005 | Ward et al. |
| 2011/0017297 A1 | 1/2011 | Aitken et al. |
| 2012/0297829 A1 | 11/2012 | Endo et al. |
| 2013/0011650 A1 | 1/2013 | Akiba et al. |
| 2014/0050911 A1 | 2/2014 | Mauro et al. |
| 2014/0323286 A1 | 10/2014 | Aitken et al. |
| 2015/0064472 A1* | 3/2015 | Gross .................. C03C 3/097 428/410 |
| 2015/0074974 A1 | 3/2015 | Pesansky et al. |
| 2015/0140325 A1* | 5/2015 | Gross .................. C03C 3/083 428/336 |
| 2015/0314571 A1* | 11/2015 | Cites .................. B32B 17/06 428/215 |
| 2016/0188103 A1 | 6/2016 | Bernstein et al. |
| 2018/0319706 A1* | 11/2018 | Murayama .............. C03C 3/085 |

FOREIGN PATENT DOCUMENTS

| | | |
|---|---|---|
| AU | 2011101310 A4 | 11/2011 |
| WO | 2015031188 A1 | 3/2015 |
| WO | 2015077135 A1 | 5/2015 |
| WO | 2015168529 A1 | 11/2015 |
| WO | 2016210244 A1 | 12/2016 |

OTHER PUBLICATIONS

Lewis, R.J. (Ed.), Beryllium, Hawley's Condensed Chemical Dictionary, 2007. (Year: 2007).*
Vogel, W., Structure and Crystallization of Glasses, Pergamon Press, 1971, pp. 21-127. (Year: 1971).*
Anurova, "Research and development of the ion-exchange process for strengthening multicomponent aluminosilicate pipe production glass" Ministry of Construction Materials Industry of the USSR, Moscow 1977. 34 pages. (Translation Attached).
Carl et al. "The effect of composition on UV-vis-NIR spectra of iron doped glasses in the systems Na2O/MgO/SiO2 and Na2O/MgO/Al2O3/SiO2", Journal of Non Crystalline Solids 353 (207), pp. 244-249.
International Search Report and Written Opinion PCT/US2018/012528 dated Mar. 12, 2018.
Knoche et al. "Non-linear temperature dependence of liquid volumes in the system albite-anorthite-diopside", Contributions to Minerology and Petrology 111 (1992) pp. 61-73.
Knoche et al. "Temperature-dependent thermal expansivities of silicate melts: the system anorthite-diopside", Geochimica et Cosmochimica Acta 56 (1992) pp. 689-699.
Lisenenkov, "Distrbution of calcium and sodium cations among silicon-oxygen and aluminum-silicon-oxgen anions in melts and glasses" Physics and Chemistry of Glassa, 1982, 8(2), p. 181-186. (Translation Attached).
Morey, "The effect of alumina on the devitrification of a soda-lime-silica glass", J .Am. Ceram. Soc., 1930, 13(10), p. 718-724.

(Continued)

*Primary Examiner* — Elizabeth A. Bolden
(74) *Attorney, Agent, or Firm* — John P. McGroarty

(57) ABSTRACT

Provided herein is a glass composition comprising: about 72 mol % to about 77 mol % $SiO_2$; about 8 mol % to about 12 mol % $Al_2O_3$; about 10 mol % to about 14 mol % of one or more alkali oxide $R_2O$, wherein $R_2O$ is $Li_2O$, $Na_2O$, $K_2O$, $Rb_2O$, or $Cs_2O$; one or more divalent oxide RO, wherein RO is MgO, CaO, SrO, BaO, or ZnO; and $P_2O_5$, wherein the ratio of mol % RO/(mol % $R_2O$+mol % RO) is at least about 0.2. The glass composition has one or more of the following characteristics: (i) a low temperature (form 25° C. to 300° C.) coefficient thermal expansion (LTCTE) of less than 7.5 ppm/° C.; (ii) high temperature coefficient thermal expansion (HTCTE) of less than 18 ppm/° C.; (iii) liquidus viscosity of at least 200,000 poise; (iv) glass temperature of at least 1100° C. at 200,000 poise or at least 1200° C. at 35,000 poise; and (v) a fictive temperature $T_f$ less than about 795° C.

23 Claims, 2 Drawing Sheets

(56) References Cited

OTHER PUBLICATIONS

Murashova et al. "Alkali resistance of Na2O—Al2O3—SiO2 system glasses with additives of oxides of alkali-earth metals and zinc", Physics and Chemistry of Glass, 1983, 9(3), p. 336-338. (Translation Attached).

Russel and Wiedenroth, "The effect of glass composition on the thermodynamics of the Fe2+/Fe3+ equilibrium and the iron diffusivity in Na2O/CaO/Al2O3/SiO2 melts," Chemical Geology, 2004, 213(1-3), p. 125-135.

Schairer and Yoder, "The nature of residual liquids from crystallization, with data on the system nepheline-diopside-silica," American Journal of Science, 1960, vol. 258-A, p. 273-283.

Xiaoju Guo et al. in "Unified approach for determining the enthalpic fictive temperature of glasses with arbitrary thermal history," Journal of Non-Crystalline Solids 357 (2011) pp. 3230-3236.

* cited by examiner

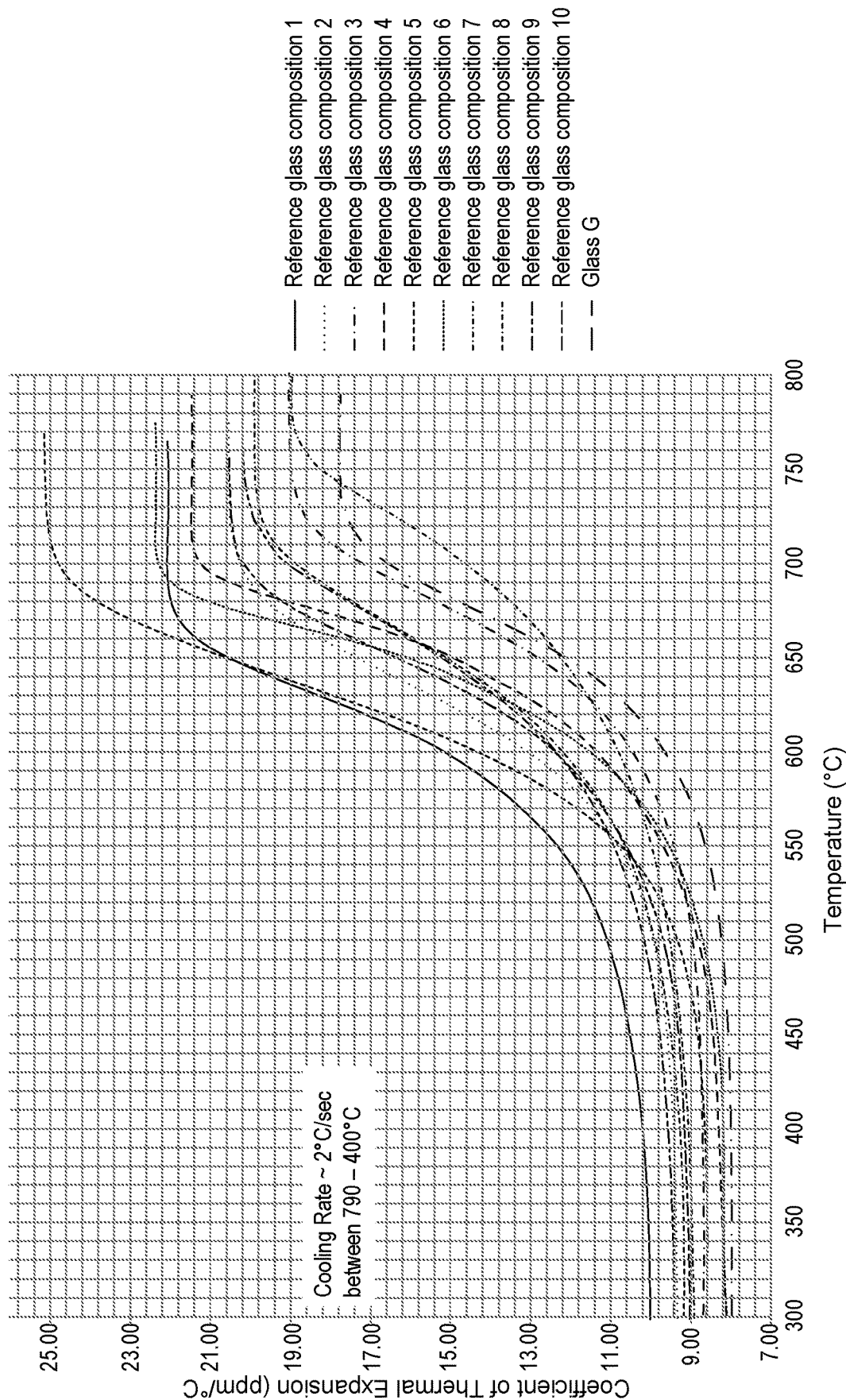
Fig. 1 High temperature coefficient of thermal expansion of Glass G according to present disclosure as compared to ten reference glass compositions

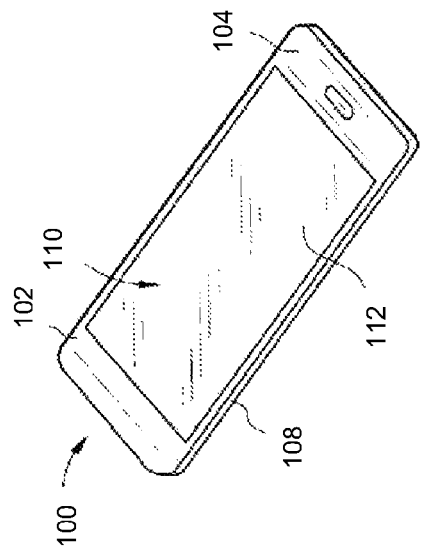
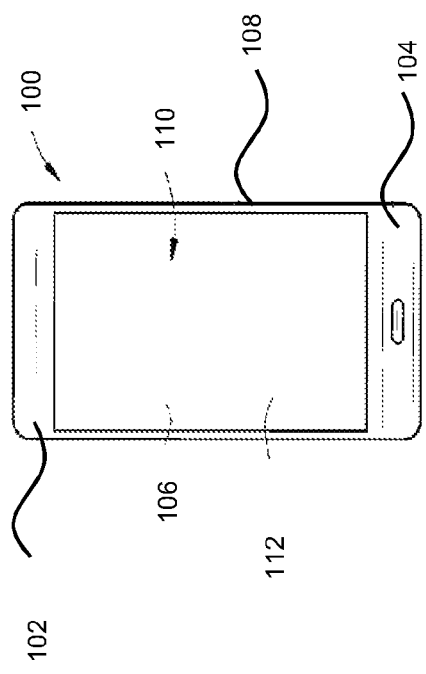

ION-EXCHANGEABLE GLASS WITH LOW COEFFICIENT OF THERMAL EXPANSION

CROSS-REFERENCE TO RELATED APPLICATIONS

This application claims the benefit of priority under 35 U.S.C. § 119 of U.S. Provisional Application Ser. No. 62/443,918 filed on Jan. 9, 2017 the content of which is relied upon and incorporated herein by reference in its entirety.

FIELD AND BACKGROUND

The present disclosure is generally related to novel glass compositions and glass articles incorporating the same.

Thin and ultra-thin glasses have numerous applications, including semiconductor, opto-electronic and consumer electronic applications, as well as automotive and biotech industry applications. Glass articles, such as cover glasses, glass backplates and the like, are employed in both consumer and commercial electronic devices such as, mobile phones, tablets, computers, navigation systems, and the like.

Glass articles may benefit from enhanced strength that enable the article to withstand a variety of contacts and impacts. For many glass articles, incidental contact and impacts may occur when the device is being used or transported. In addition, some glass articles include "touch" functionality, which involves contact between the article and various objects, including a user's fingers and/or stylus devices.

BRIEF SUMMARY

In some embodiments, a glass composition comprises: about 72 mol % to about 77 mol % $SiO_2$; about 8 mol % to about 12 mol % $Al_2O_3$; about 10 mol % to about 14 mol % of one or more alkali oxide $R_2O$, wherein $R_2O$ is $Li_2O$, $Na_2O$, $K_2O$, $Rb_2O$, or $Cs_2O$; one or more divalent oxide RO, wherein RO is MgO, CaO, SrO, BaO, or ZnO; and $P_2O_5$, wherein the ratio of mol % RO/(mol % $R_2O$+mol % RO) is at least about 0.2, or between about 0.2 and about 0.5.

In some embodiments, the embodiments of any of the preceding paragraphs may further include the glass composition comprises about 72 mol % to about 75 mol % $SiO_2$. In some embodiments, the glass composition comprises about 9 mol % to about 11 mol % $Al_2O_3$. In some embodiments, the alkali oxide $R_2O$ of the glass composition comprises about 11 mol % to about 13 mol % $Na_2O$. In some embodiment, the divalent oxide RO of the glass composition comprises about 0.03 mol % to about 4 mol % MgO; about 0.03 mol % to about 5 mol % CaO; and about 0.03 mol % to about 4 mol % ZnO. In some embodiments, the glass composition comprises about 0.01 mol % to about 2 mol % $P_2O_5$. In some embodiments, the glass composition further comprises $B_2O_3$ and/or $SnO_2$. In some embodiments, the glass composition is substantially free of $K_2O$, $B_2O_3$, and/or $Li_2O$.

In some embodiments, the present disclosure also provides a glass composition comprising: about 72 mol % to about 77 mol % $SiO_2$; about 8 mol % to about 12 mol % $Al_2O_3$; about 10 mol % to about 14 mol % $Na_2O$; about 0.03 mol % to about 4 mol % MgO; about 0.03 mol % to about 5 mol % CaO; up to about 4 mol % ZnO; about 0.03 mol % to about 2 mol % $P_2O_5$; and about 0.03 mol % to about 0.09 mol % $SnO_2$, wherein the ratio of mol % $Na_2O$/(mol % $Na_2O$+mol % MgO+mol % CaO+mol % ZnO) is between about 0.2 and about 0.5. In some embodiments, the glass composition is substantially free of $K_2O$, $B_2O_3$, and/or $Li_2O$.

The glass composition described herein can be characterized by certain properties. For example, in some embodiments, the glass composition (i) a low temperature coefficient thermal expansion (LTCTE) of less than 7.5 ppm/° C.; (ii) a high temperature coefficient thermal expansion (HTCTE) of less than 18 ppm/° C.; (iii) a liquidus viscosity of at least 200,000 poise; (iv) a glass temperature of at least 1100° C. at 200,000 poise or at least 1200° C. at 35,000 poise; and (v) a fictive temperature $T_f$ (equal to the temperature at which the glass composition has a viscosity of about $10^{11}$ poise) less than about 795° C.

In some embodiments, the glass composition described herein is ion-exchange strengthened. In some embodiments, the ion-exchanged composition of the present disclosure has a depth of a compressive layer of at least 10 microns (e.g., about 15 to about 100 microns); and/or (2) a compressive strength of at least 450 MPa (e.g., from about 550 MPa to about 650 MPa).

Some embodiments of the present disclosure are directed to a glass based article comprising the glass composition described herein. In some embodiments, the glass based article has a glass thickness of up to 3 mm. In some embodiments, the glass based article is a force sensor substrate in a consumer electronic device.

Some embodiments of the present disclosure are directed to a process for preparing a glass from the glass composition described herein.

BRIEF DESCRIPTION OF THE FIGURES

The foregoing summary, as well as the following detailed description of the embodiments, will be better understood when read in conjunction with the appended figures. For the purpose of illustration, the figures may describe the use of specific embodiments. It should be understood, however, that the compositions and methods described herein are not limited to the precise embodiments discussed or described in the figures.

FIG. 1 shows that a glass (Glass G) of the present disclosure has low HTCTE value (≤18 ppm/° C.), which is lower than the HTCTE values of any of the reference non-ion-exchanged glasses.

FIG. 2A is a plan view of an exemplary electronic device incorporating any of the glass articles disclosed herein.

FIG. 2B is a perspective view of the exemplary electronic device of FIG. 2A.

DETAILED DESCRIPTION

Definitions

Open terms such as "include," "including," "contain," "containing" and the like mean "comprising." These open-ended transitional phrases are used to introduce an open ended list of elements, method steps or the like that does not exclude additional, unrecited elements or method steps.

The indefinite articles "a" and "an" preceding an element or component of the disclosure are intended to be nonrestrictive regarding the number of instances, i.e., occurrences of the element or component. Therefore "a" or "an" should be read to include one or at least one, and the singular word form of the element or component also includes the plural unless the number is obviously meant to be singular.

As used herein, the term "about" modifying a value related to the disclosure refers to variation in the numerical quantity that can occur, for example, through routine testing and handling; through inadvertent error in such testing and handling; through differences in the manufacture, source, or purity of ingredients employed in the disclosure; and the like. Whether or not modified by the term "about", the claims include equivalents of the recited quantities. In some embodiments, the term "about" means within ±10% of the reported numerical value.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

As used herein, "substantially free" of a component (e.g., a metal oxide) in a glass composition means that the component is not purposefully added to the composition, but the composition may still contain the component in very small or trace amount, e.g., not more than 0.5 mol %, or not more than 0.1 mol %, or not more than 0.01 mol % in the glass composition. The term "substantially free" of a component (e.g., a metal oxide) in a glass composition described herein can also mean that the glass composition is free of the component.

As used herein, the terms "glass based article" and "glass based articles" are used in their broadest sense to include any object made wholly or partly of glass. In some embodiments, the glass based article(s) can have an amorphous phase and one or more crystalline phases.

Whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any sub-ranges therebetween. Unless otherwise specified, all compositions and relationships that include constituents of compositions described herein are expressed in mole percent (mol %) on a metal oxide basis.

As used herein, the term "low temperature coefficient thermal expansion" or "LTCTE," refers to the average coefficient of linear thermal expansion of the glass composition over a temperature range from about 20° C. to about 300° C. and is determined using a push-rod dilatometer in accordance with ASTM E228-11.

As used herein, the term "high temperature coefficient thermal expansion" or "HTCTE," refers to the coefficient of thermal expansion of the glass composition above the glass transition temperature. The HTCTE is determined by plotting the instantaneous CTE (y-axis) as a function of the temperature (x-axis) and the HTCTE is the value of the instantaneous CTE where the slope of the instantaneous CTE v. temperature curve is approximately zero following pronounced increase (i.e. where the curve plateaus). Instantaneous CTE is defined in ASTM E228-11. The measurement of the instantaneous CTE relies on the use of a 3D digital image correlation (DIC) as a strain sensor and the heating is performed in a furnace with a viewing window for the DIC.

As used herein, the term "liquidus viscosity," The term "liquidus viscosity" refers to the viscosity of a molten glass at the liquidus temperature, wherein the liquidus temperature refers to the temperature at which crystals first appear as a molten glass cools down from the melting temperature, or the temperature at which the very last crystals melt away as temperature is increased from room temperature. The liquidus viscosity is determined by the following method. First the liquidus temperature of the glass is measured in accordance with ASTM C829-81 (2015), titled "Standard Practice for Measurement of Liquidus Temperature of Glass by the Gradient Furnace Method". Next the viscosity of the glass at the liquidus temperature is measured in accordance with ASTM C965-96(2012), titled "Standard Practice for Measuring Viscosity of Glass Above the Softening Point".

As used herein, the term "fictive temperature $T_f$," refers to a temperature that is equal to the temperature at which the viscosity of the glass-forming liquid has a viscosity of about $10^{11}$ poise. For a particular glass, the fictive temperature can vary depending on the cooling rate from the molten state. The glass structure can also relax to a new fictive temperature with heat treatment at that particular temperature. The fictive temperature of a glass may be determined by calorimetric methods, as described by Xiaoju Guo et al. in "Unified approach for determining the enthalpic fictive temperature of glasses with arbitrary thermal history," (Journal of Non-Crystalline Solids 357 (2011) pp. 3230-3236), which is incorporated herein by reference in its entirety.

As used herein, the term "zircon breakdown temperature" or "$T^{breakdown}$" refers to the temperature at which zircon—which is commonly used as a refractory material in glass processing and manufacture—breaks down to form zirconia and silica, and the term "zircon breakdown viscosity" refers to the viscosity of the glass at $T^{breakdown}$.

The terms "disclosure" or "present disclosure" as used herein are non-limiting terms and are not intended to refer to any single embodiment of the particular disclosure but encompass all possible embodiments as described in the application.

Various processes may be used to strengthen glass articles, including thermal tempering, and chemical tempering. Chemical tempering includes ion-exchange, which generally involves exchanging smaller alkali ions in the glass article (such as lithium ions and/or sodium ions) for larger alkali ions (such as potassium ions). Accordingly, in order to facilitate ion-exchange process, such glass articles may include a relatively high concentration of alkali ions.

The presence of alkali ions in the glass article may increase the average coefficient of thermal expansion of the glass article and, as such, the glass article may not be suitable for use in applications where a glass article with a relatively lower average coefficient of thermal expansion is desired. Also, high coefficients of thermal expansion in both the low and high temperature regimes make direct drawing of thin glass highly challenging. Thus, a need exists for alternative glass compositions that can be chemically strengthened, e.g., ion-exchangeable glasses, with a low temperature coefficient thermal expansion (LTCTE), and/or a high temperature coefficient thermal expansion (HTCTE).

Glass Compositions

The present disclosure provides a novel glass composition that is fusion formable, zircon compatible, and ion-exchangeable, and has a low coefficient thermal expansion both at low and high temperatures.

In some embodiments, the present disclosure provides a glass composition comprising about 72 mol % to about 77 mol % $SiO_2$; about 8 mol % to about 12 mol % $Al_2O_3$; about 10 mol % to about 14 mol % of one or more alkali oxide $R_2O$, wherein $R_2O$ is $Li_2O$, $Na_2O$, $K_2O$, $Rb_2O$, or $Cs_2O$; one or more divalent oxide RO, wherein RO is MgO, CaO, SrO, BaO, or ZnO; and $P_2O_5$.

$SiO_2$, an oxide involved in the formation of glass functions to stabilize the networking structure of glass. The glass composition of the present disclosure contains from about 72 mol % to about 77 mol % $SiO_2$ and all ranges and subranges therebetween for example, from about 72 mol % to about 76.5 mol %, from about 72 mol % to about 76 mol %, from about 72 mol % to about 75.5 mol %, from about 72 mol % to about 75 mol %, from about 72 mol % to about 74.5 mol %, from about 72 mol % to about 74 mol %, from about 72 mol % to about 73.5 mol %, from about 72 mol % to about 73 mol %, or about 76.5 mol %, about 76 mol %, about 75.5 mol %, about 75 mol %, about 74.5 mol %, about 74 mol %, about 73.5 mol %, about 73 mol %, about 72.5 mol %, or about 72 mol % $SiO_2$. In some embodiments, the glass composition contains from about 72 mol % to about 74.5 mol % $SiO_2$.

$Al_2O_3$ also serves as a glass former. Like $SiO_2$, $Al_2O_3$ can also contribute rigidity to the glass network due to its tetrahedral coordination. $Al_2O_3$ may provide for a) maintaining the lowest possible liquidus temperature, b) lowering the expansion coefficient, or c) enhancing the strain point. An increase in $Al_2O_3$ content relative to other glass modifier oxides generally results in decreased density, decreased coefficient of thermal expansion, and improved durability. The glass composition of the present disclosure contains from about 8 mol % to about 12 mol % $Al_2O_3$, and all ranges and subranges therebetween, for example, from about 8 mol % to about 11.5 mol %, from about 8 mol % to about 11 mol %, from about 8 mol % to about 10.5 mol %, from about 8 mol % to about 10 mol %, from about 8 mol % to about 9.5 mol %, from about 8 mol % to about 9 mol %, from about 9 mol % to about 11.5 mol %, from about 9 mol % to about 11 mol %, or about 8 mol %, about 8.2 mol % to about 8.4 mol %, about 8.6 mol % to about 8.8 mol %, about 9 mol %, about 9.2 mol %, about 9.4 mol %, about 9.6 mol %, about 9.8 mol %, about 10 mol %, about 10.2 mol %, about 10.4 mol %, about 10.6 mol %, about 10.8 mol %, about 11 mol %, about 11.2 mol %, about 11.4 mol %, about 11.6 mol %, about 11.8 mol %, or about 12 mol %. In some embodiments, the glass composition contains from about 9.9 mol % to about 10.1 mol % $Al_2O_3$.

The glass composition of the present disclosure contains about 10 mol % to about 14 mol % of one or more alkali oxide $R_2O$; that is, the sum of $R_2O$ is from about 10 mol % to about 14 mol %. As described herein, an alkali oxide includes all forms of alkali metal oxide that can exist in a glass or glass based composition. Alkali oxides $R_2O$ aids in achieving low melting temperature and low liquidus temperatures of the glass. $R_2O$ includes, but is not limited to $Li_2O$, $Na_2O$, $K_2O$, $Rb_2O$, or $Cs_2O$. In some embodiments, the glass composition contains one alkali oxide that is $Na_2O$, or $Li_2O$ or $K_2O$. In some embodiments, the glass composition contains two alkali oxides, for example, $Na_2O$ and $Li_2O$, or $Na_2O$ and $K_2O$, or $Li_2O$ and $K_2O$. In some embodiments, the glass composition contains three alkali oxides, for example, $Na_2O$, $Li_2O$, and $K_2O$.

In some embodiments, the glass composition contains $Na_2O$ in an amount from about 10 mol % to about 14 mol % and all ranges and subranges therebetween, for example, from 10 mol % to about 13.5 mol %, from 10 mol % to about 13 mol % from, from 10 mol % to about 12.5 mol %, from 10 mol % to about 12 mol %, from 10 mol % to about 11.5 mol %, from 10 mol % to about 11 mol %, from about 11 mol % to about 13 mol %, from about 12 mol % to about 13 mol %, or about 10 mol %, about 10.2 mol %, about 10.4 mol %, about 10.6 mol %, about 10.8 mol %, about 12 mol %, about 12.2 mol %, about 12.4 mol %, about 12.6 mol %, about 12.8 mol %, about 13 mol %, about 13.2 mol %, about 13.4 mol %, about 13.6 mol %, about 13.8 mol %, or about 14 mol %. In some embodiments, the glass composition contains from about 10.5 mol % to about 12.7 mol % $Na_2O$.

The glass composition of the present disclosure contains one or more divalent oxide RO, which also improves the melting behavior of the glass. RO includes, but is not limited to MgO, CaO, SrO, BaO, or ZnO. In some embodiments, the glass composition contains one divalent oxide that is MgO, CaO, SrO, BaO or ZnO. In some embodiments, the glass composition contains two divalent oxides, MgO and CaO, or MgO and ZnO, or CaO and ZnO. In some embodiments, the glass composition contains three divalent oxides MgO, CaO and ZnO.

MgO and CaO are effective in decreasing the viscosity of glass at a higher temperature and enhancing the viscosity of glass at a lower temperature. They may be used for the improvement of the melting property and enhancement of the strain point. However, if excessive amounts of both MgO and CaO are used, there may be an increasing trend toward phase separation and devitrification of the glass. The smaller divalent oxides (e.g., MgO, CaO or ZnO) generally help increase the compressive stress of the glass more than the larger divalent oxides (e.g., SrO, or BaO). Thus, MgO, CaO and ZnO offer several advantages with respect to improved stress relaxation while minimizing the adverse effects on alkali diffusivity. However, when the concentrations of MgO and ZnO in the glass are high, they are prone to form forsterite (e.g., $Mg_2SiO_4$) and gahnite ($ZnAl_2O_4$) or willemite ($Zn_2SiO_4$), respectively, thus causing the liquidus temperature of the glass to rise very steeply when the MgO and ZnO contents are above certain levels.

In some embodiments, the glass composition contains MgO in an amount up to about 4 mol %, for example from about 0.03 mol % to about 4 mol % and all ranges and subranges there between. In some embodiments, the glass compositions contain MgO in an amount from about 0.03 mol % to about 3.5 mol %, from about 0.03 mol % to about 3 mol %, from about 0.03 mol % to about 2.5 mol %, from about 0.03 mol % to about 2 mol %, from about 0.03 mol % to about 1.5 mol %, from about 0.03 mol % to about 1 mol %, from about 0.03 mol % to about 0.5 mol %, from about 0.03 mol % to about 0.1 mol %, from about 0.05 mol % to about 4 mol %, from about 0.05 mol % to about 3 mol %, from about 0.05 mol % to about 2 mol %, from about 1 mol % to about 4 mol %, from about 1 mol % to about 3 mol %, from about 1 mol % to about 2 mol %, from about 2 mol % to about 3 mol %, from about 2 mol % to about 4 mol %, from about 3 mol % to about 4 mol %.

In some embodiments, the glass composition contains CaO in an amount up to about 5 mol %, for example, from about 0.03 mol % to about 5 mol % and all ranges and subranges there between. In some embodiments, the glass compositions contain CaO in an amount from about 0.03 mol % to about 4.5 mol %, from about 0.03 mol % to about 4 mol %, from about 0.03 mol % to about 3.5 mol %, from about 0.03 mol % to about 3 mol %, from about 0.03 mol % to about 2.5 mol %, from about 0.03 mol % to about 2 mol %, from about 0.03 mol % to about 1.5 mol %, from about 0.03 mol % to about 1 mol %, from about 0.03 mol % to about 0.5 mol %, from about 0.03 mol % to about 0.1 mol %, from about 0.05 mol % to about 5 mol %, from about 0.05 mol % to about 4 mol %, from about 0.05 mol % to about 3 mol %, from about 0.05 mol % to about 2 mol %, from about 1 mol % to about 5 mol %, from about 1 mol % to about 4 mol %, from about 1 mol % to about 3 mol %, from about 1 mol % to about 2 mol %, from about 2 mol % to about 3 mol %, from about 2 mol % to about 4 mol %, from about 2 mol % to about 5 mol %, from about 3 mol % to about 4 mol %, or from about 3 mol % to about 5 mol %. In some embodiments, the glass composition contains ZnO in an amount up to about 4 mol %, for example, up to about 3.5 mol %, up to about 3 mol %, up to about 2.5 mol %, up to about 2 mol %, or up to about 1.5 mol %, or from about 0.03 mol % to about 4 mol % and all ranges and subranges there between. In some embodiments, the glass compositions contain ZnO in an amount from about 0.03 mol % to about 3.5 mol %, from about 0.03 mol % to about 3 mol %, from about 0.03 mol % to about 2.5 mol %, from about 0.03 mol % to about 2 mol %, from about 1 mol % to about 4 mol %, from about 1 mol % to about 3.5 mol %, from about 1 mol % to about 3 mol %, from about 1 mol % to about 2.5 mol %, from about 1 mol % to about 2 mol %, from about 2 mol % to about 4 mol %, from about 2 mol % to about 3 mol %, from about 3 mol % to about 4 mol %.

The glass composition described herein also contains $P_2O_5$, which can improve the diffusivity of alkali cations and decrease ion exchange times. In some embodiments, $P_2O_5$ is present in an amount from about 0.01 mol % to about 2 mol %, and all ranges and subranges therebetween, for example, from about 0.01 mol % to about 1.5 mol %, from about 0.01 mol % to about 1 mol %, from about 0.03 mol % to about 2 mol %, from about 0.03 mol % to about 1.5 mol %, or from about 0.03 mol % to about 1 mol %.

In some embodiments, the glass composition of the present disclosure can further contain $B_2O_3$ and/or $SnO_2$. In some embodiments, $B_2O_3$ or $SnO_2$ is present in an amount up to about 0.1 mol %, for example, from about 0.03 mol % to about 0.1 mol % and all ranges and subranges there between. In some embodiments, the glass compositions contain $B_2O_3$, and/or $SnO_2$ from about 0.03 mol % to about 0.09 mol %, from about 0.03 mol % to about 0.08 mol %, from about 0.03 mol % to about 0.07 mol %, from about 0.03 mol % to about 0.06 mol %, from about 0.03 mol % to about 0.05 mol %, from about 0.03 mol % to about 0.04 mol %, from about 0.05 mol % to about 0.09 mol %, from about 0.05 mol % to about 0.08 mol %, from about 0.05 mol % to about 0.07 mol %, or from about 0.05 mol % to about 0.06 mol %. In some embodiments, the glass composition contains about 0.04 mol %, about 0.05 mol %, 0.06 mol %, about 0.07 mol %, about 0.08 mol % of $B_2O_3$, and/or $SnO_2$.

In some embodiments, the glass composition comprises about 72 mol % to about 75 mol % $SiO_2$; about 9 mol % to about 11 mol % $Al_2O_3$; about 11 mol % to about 13 mol % $Na_2O$; one or more divalent oxide RO, wherein RO is MgO, CaO, SrO, BaO, or ZnO; and $P_2O_5$.

In some embodiments, the glass composition comprises about 72 mol % to about 77 mol % $SiO_2$; about 8 mol % to about 12 mol % $Al_2O_3$; about 10 mol % to about 14 mol % $Na_2O$; about 0.03 mol % to about 4 mol % MgO; about 0.03 mol % to about 5 mol % CaO; up to about 4 mol % ZnO; about 0.03 mol % to about 2 mol % $P_2O_5$; and about 0.03 mol % to about 0.09 mol % $SnO_2$.

In some embodiments, the glass composition comprises about 72.17 mol % to about 74.37 mol % $SiO_2$; about 9.95 mol % to about 10.04 mol % $Al_2O_3$; about 10.59 mol % to about 12.69 mol % $Na_2O$; about 0.05 mol % to about 3.08 mol % MgO; about 0.03 mol % to about 4.04 mol % CaO; up to about 2.94 mol % ZnO; about 0.03 mol % to about 0.96 ml % $P_2O_5$; and about 0.05 mol % to about 0.07 mol % $SnO_2$.

In some embodiments, the glass composition is substantially free of $K_2O$, $B_2O_3$, and/or $Li_2O$.

The glass composition of the present disclosure has a ratio of mol % RO/(mol % $R_2O$+mol % RO) is at least about 0.2, for example, between about 0.2 and about 0.5 and all ranges and subranges therebetween. In some embodiments, the ratio of mol % RO/(mol % $M_2O$+mol % RO) is about 0.2, about 0.21, about 0.22, about 0.23, about 0.24, about 0.25, about 0.26, about 0.27, about 0.28, about 0.29, about 0.30, about 0.31, about 0.32, about 0.33, about 0.34, about 0.35, about 0.36, about 0.37, about 0.38, about 0.39, about 0.40, about 0.41, about 0.42, about 0.43, about 0.44, about 0.45, about 0.46, about 0.47, about 0.48, about 0.49, about 0.5. The ratio of mol % RO/(mol % $R_2O$+mol % RO) is advantageously kept between about 0.2 and about 0.5, so that a substantial percentage of the modifier oxides are divalent oxides. When divalent oxide modifiers are substituted by monovalent oxide modifiers, both high and low temperature CTEs increase.

Properties of Glass Based Articles

The glass compositions described herein have favorable properties. For example, in some embodiments, the glass composition exhibits one or more characteristics: (i) a low temperature coefficient thermal expansion (LTCTE) of less than 7.5 ppm/° C.; (ii) a high temperature coefficient thermal expansion (HTCTE) of less than 18 ppm/° C.; (iii) a liquidus viscosity of at least 200,000 poise; (iv) a glass temperature of at least 1100° C. at 200,000 poise or at least 1200° C. at 35,000 poise; and (v) a fictive temperature Tf less than about 795° C.

In some embodiments, the present disclosure provides a glass composition that exhibits a low LTCTE. In some embodiments, the LTCTE is less than about 7.5 ppm/° C., for example, less than about 7.4, 7.3, 7.2, 7.1, 7.0, 6.9, 6.8, 6.7, 6.6, or 6.5 ppm/° C. In some embodiments, the LTCTE ranges from about 6.4 to less than about 7.5 ppm/° C. and all ranges and subranges therebetween, for example from about 6.4 to about 7.4 ppm/° C., or from about 6.4 to about 7.3 ppm/° C.

In some embodiments, the present disclosure also provides a glass composition that exhibits a low HTCTE. In some embodiments, the HTCTE is less than about 18 ppm/° C., for example, less than about 17.8, 17.6, 17.4, 17.2, 17.0, 16.8, 16.6, 16.4, 16.2, 16.0, or 15.8 ppm/° C. In some embodiments, the HTCTE ranges from about 15.6 to less than about 18 ppm/° C. and all ranges and subranges therebetween, for example, from about 15.6 to about 17.8 ppm/° C., from about 15.6 to about 17.4 ppm/° C., or about 15.6 to about 17.2 ppm/T.

These low LTCTE and HTCTE values improve the survivability of the glass to thermal cycling or thermal stress conditions relative to glass compositions with higher LTCTE and HTCTE values.

In some embodiments, the present disclosure provides a glass composition that has a liquidus viscosity of at least about 200,000 poise, for example, at least about 300,000, 400,000, 500,000, 600,000, 700,000, 800,000, 900,000, 1,000,000, 2,000,000, 3,000,000, or 4,000,000 poise. In some embodiments, the liquidus viscosity ranges from about 200,000 poise to about 4,200,000 poise and all ranges and subranges therebetween.

In some embodiments, the present disclosure provides a glass composition that has a glass temperature of at least about 1100° C. at 200,000 poise or at least 1200° C. at 35,000 poise. In some embodiments, the glass temperature is at least about 1110, 1120, 1130, 1140, 1150, 1160, 1170, 1180 or 1190° C. at 200,000 poise; or is at least about 1210, 1220, 1230, 1240, 1250, 1260, 1270, 1280, 1290, 1300, or 1310° C. at 35,000 poise. In some embodiments, the glass temperature ranges from about 1100° C. to about 1200° C. at 200,000 poise and all ranges and subranges therebetween, or from about 1200° C. to about 1320° C. at 35,000 poise and all ranges and subranges therebetween. In some embodiments, this disclosure provides a glass composition that has a fictive temperature $T_f$ of less than about 795° C., for example, from about 738 to about 793° C. In some embodiments, the fictive temperature is at less than about 795, 790, 785, 780, 775, 770, 765, 760, 755, 750, or 745° C. Fictive temperature is used to describe the temperature of the equilibrium structure of the glass. If a glass is heated and held at a temperature for a long enough period of time, the glass will eventually assume the equilibrium structure corresponding to that temperature. Conversely, if a glass is rapidly cooled from a temperature above the transition region (as it is in some glass manufacturing operations), it will retain the properties characteristic of this temperature, in which case this temperature will be the fictive temperature of that glass.

Process of Making Glass or Glass Based Articles

The glass of the present disclosure is down-drawable, i.e., the glass is capable of being formed into sheets using down-draw methods such as, but not limited to, fusion draw and slot draw methods that are known to those skilled in the glass fabrication arts. The down-draw processes are used in the large-scale manufacture of flat glass, for example, display glass or ion-exchangeable glass.

The fusion draw process uses a forming body that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the isopipe. These outside surfaces extend down and inwardly so that they join at an edge below the drawing tank. The two flowing glass surfaces join at this edge to fuse and form a single flowing sheet. The fusion draw method offers the advantage that, since the two glass films flowing over the channel fuse together, neither outside surface of the resulting glass sheet comes in contact with any part of the apparatus. Thus, the surface properties are not affected by such contact.

The glass composition of present disclosure has a low temperature coefficient thermal expansion (LTCTE) of less than 7.5 ppm/° C., and a high temperature coefficient thermal expansion (HTCTE) of less than 18 ppm/° C. In addition, the glass composition has a viscosity curve preferred for fusion forming. Specifically, the temperature at 200,000 poise is greater than 1100° C.; the temperature at 35,000 poise is greater than 1200° C.; the liquidus viscosity is greater than 200,000 poise (e.g., greater than 1,000,000 poise for some embodiments); and the zircon breakdown viscosity is less than 35,000 poise. Thus, the glass composition of present disclosure is fusion formable, and is ideally suited for fusion draw process, so that thin glass sheets can be directly formed. In some embodiments, the thin glass sheets can have thickness of up to about 3 mm, and all ranges and subranges therebetween, for example up to about 2 mm, or up to about 1 mm. In some embodiments, thin glass sheet can have thickness of about 1000 microns or less, about 800 microns or less, about 600 microns or less, about 400 microns or less, about 200 microns or less, for example, between about 20 and 500 microns, between about 50 and 400 microns, or about 50, 100, 150, 200, 250, 300, 350 or 400 microns.

The slot draw method is distinct from the fusion draw method. In slot draw process, the molten glass raw material is provided to a conduit. The bottom of the conduit has an open slot that is wider in one dimension than the other dimension with a nozzle that extends the length of the slot. The molten glass flows through the slot/nozzle and is drawn downward as a continuous sheet there through and into an annealing region.

Alternatively, the glass of the present disclosure may be formed by other processes, such as rolling, float, etc.

The glass of the present disclosure is ion-exchangeable to strengthen its mechanical properties. Typically, glass is ion exchanged in a salt bath comprising one or more salts of alkali ions. Smaller alkali ions (e.g., lithium or sodium) that are present in the glass can be ion-exchanged in a molten salt bath containing one or more larger alkali ions, such as sodium, potassium, rubidium or cesium. If ion-exchange is performed at a temperature well below the strain point for sufficient time, a diffusion profile will form in which the larger alkali moves into the glass surface from the salt bath, and the smaller ion is moved out of the glass into the salt bath. As the glass cools, the larger ions (e.g., potassium ion) compress the glass together, creating a compressive stress layer that forms a tough surface against damage. Ion-exchange process will also provide glass protection against adverse environmental conditions.

Those skilled in the art would understand that any monovalent cations (e.g., copper, silver, thallium, etc.) can be exchanged for alkali ions present in the glass. These cations may also provide attributes of potential value to end uses, such as introducing color for lighting or a layer of elevated refractive index for light trapping.

In some embodiments, the glass of the present disclosure, having various thicknesses can be ion-exchanged at 410° C. in 100% $KNO_3$ for 4 and 8 hours, respectively. For example, the glass of the present disclosure (thickness of 0.4 mm) can be ion-exchanged to have a compressive stress at the surface greater than 650 MPa and a the depth of the compressive stress layer (also known as "depth of compression" or "DOC") of greater than 25 microns.

In some embodiments, the glass of the present disclosure (thickness of 0.1 mm) can be ion-exchanged to have a compressive stress at the surface greater than 550 MPa and a depth of compression of 20 microns, or can be ion-exchanged to have a compressive stress at the surface greater than 450 MPa and a depth of compression of 15 microns.

Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

As used herein, DOC means the depth at which the stress in the chemically strengthened alkali aluminosilicate glass article described herein changes from compressive to tensile. DOC may be measured by FSM or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM.

The present disclosure also provides a glass product produced by any of the processes described herein. In general, these products produced also share the physical property characteristics as described herein.

Applications

The glass or glass based articles described herein can have various applications, for example, where a thin glass with a high fracture toughness is desired. Those skilled in the art would understand that the glass or glass based articles described herein can take various shapes, thickness, etc. according to its specific applications.

For example, the glass or glass based articles disclosed herein may be incorporated into another article such as an article with a display (or display articles) (e.g., consumer electronics, including mobile phones, tablets, computers, laptops, navigation systems, and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the glass and glass based articles disclosed herein is shown in FIGS. 2A and 2B. Specifically, FIGS. 2A and 2B show a consumer electronic device 100 including a housing 102 having front 104, back 106, and side surfaces 108; electrical components (not shown) that are at least partially inside or entirely within the housing and including at least a controller, a memory, and a display 110 at or adjacent to the front surface of the housing; and a cover substrate 112 at or over the front surface of the housing such that it is over the display. In some embodiments, the cover substrate 112 may include any of the glass and glass based articles disclosed herein.

One particular application is a portable electronic device with a force sensor substrate. Examples of force sensors are described in, e.g., U.S. Pat. Appl. Pub. Nos. 20050042012 A1 and 20160188103 A1. A force sensor is an additional layer that is added to the display stack. In some embodiments, the force sensor can be disposed above or on top of cover substrate 112. In other embodiments, the force sensor can be disposed beneath or under cover substrate 112 (e.g., between cover substrate 112 and above display 110). Because the force sensor is an additional layer, it needs to be thin to accommodate the general trend of thinner and lighter devices. The present disclosure provides such a thin or ultra-thin glass sheet suitable for force sensor application.

EXAMPLES

The following examples further illustrate the advantages and features of this disclosure and are in no way intended to limit this disclosure thereto.

Example 1

Glass Compositions

Ten exemplary inventive glass compositions (Glass A-Glass J) according to the present disclosure were prepared. The specific compositions of each exemplary glass composition are described below in Table 1.

The LTCTE and HTCTE values, liquidus viscosity, glass temperatures (at 2000,000 poise and at 35,000 poise, respectively), and fictive temperature of each exemplary glass composition were determined and described in Table 1. The LTCTE, HTCTE, and fictive temperature were measured according to the techniques discussed above. In addition, the density, strain point, anneal point, softening point, stress optical coefficient, refractive index, and other properties of each exemplary glass composition were also determined and described in Table 1. The density was determined using the buoyancy method of ASTM C693-93(2013). The strain point and annealing point were determined using the beam bending viscosity method of ASTM C598-93(2013). The softening point was determined using the parallel plate viscosity method of ASTM C1351M-96(2012).

TABLE 1

| Mol % | Glass A | Glass B | Glass C | Glass D | Glass E | Glass F |
|---|---|---|---|---|---|---|
| Exemplary glass compositions and physical properties | | | | | | |
| $SiO_2$ | 72.22 | 73.30 | 74.37 | 74.37 | 73.21 | 72.17 |
| $Al_2O_3$ | 9.96 | 10.01 | 9.98 | 10.04 | 9.95 | 9.98 |
| $P_2O_5$ | 0.00 | 0.00 | 0.00 | 0.00 | 0.00 | 0.00 |
| $Na_2O$ | 12.69 | 11.64 | 10.62 | 10.59 | 10.71 | 10.68 |
| MgO | 3.07 | 3.02 | 3.01 | 2.97 | 3.07 | 3.08 |
| ZnO | 0.00 | 0.00 | 0.00 | 0.00 | 0.00 | 0.00 |
| CaO | 2.01 | 1.99 | 1.98 | 1.97 | 3.02 | 4.04 |
| $SnO_2$ | 0.05 | 0.05 | 0.05 | 0.07 | 0.05 | 0.05 |
| RO/(RO + $R_2O$) | 0.29 | 0.30 | 0.32 | 0.32 | 0.36 | 0.40 |
| Low Temperature Coefficient of Thermal Expansion (ppm/° C.) | 7.29 | 6.95 | 6.49 | 6.53 | 6.66 | 6.73 |
| High Temperature Coefficient of Thermal Expansion (ppm/° C.) | 17.40 | 16.44 | 15.80 | 15.74 | 16.34 | 17.17 |
| Density (g/cm³) | 2.421 | 2.411 | 2.403 | 2.404 | 2.418 | 2.432 |

TABLE 1-continued

Exemplary glass compositions and physical properties

| | | | | | | |
|---|---|---|---|---|---|---|
| Strain Point (° C.) | 602 | 621 | 636 | 640 | 628 | 624 |
| Anneal Point (° C.) | 654 | 675 | 693 | 697 | 682 | 676 |
| Softening Point (° C.) | 915 | 947 | 975 | 979 | 948 | 928 |
| Fictive Temperature $T_f$ (° C.) | 742 | 767 | 792 | 793 | 773 | 763 |
| Stress Optical Coefficient (SOC) (nm/mm/MPa) | 3.068 | 3.109 | 3.125 | 3.137 | 3.102 | 3.076 |
| Refractive Index | 1.4999 | 1.4983 | 1.497 | 1.4971 | 1.5005 | 1.5036 |
| 200 Poise Temperature (° C.) | 1738 | 1775 | 1797 | 1810 | 1772 | 1727 |
| 35000 Poise Temperature (° C.) | 1235 | 1270 | 1305 | 1312 | 1270 | 1240 |
| 200000 Poise Temperature (° C.) | 1127 | 1161 | 1194 | 1200 | 1163 | 1136 |
| Liquidus viscosity (Poise) | 534,833 | 760,709 | 866,221 | 962,248 | 338,243 | 201,972 |
| Zircon breakdown viscosity (Poise) | | | | | | |

| Mol % | Glass G | Glass H | Glass I | Glass J |
|---|---|---|---|---|
| $SiO_2$ | 72.41 | 72.40 | 72.37 | 72.33 |
| $Al_2O_3$ | 10.00 | 9.99 | 9.98 | 9.99 |
| $P_2O_5$ | 0.00 | 0.96 | 0.01 | 0.01 |
| $Na_2O$ | 12.62 | 12.62 | 12.62 | 12.68 |
| MgO | 1.98 | 2.01 | 2.00 | 0.05 |
| ZnO | 0.97 | 1.94 | 2.94 | 2.94 |
| CaO | 1.97 | 0.03 | 0.03 | 1.97 |
| $SnO_2$ | 0.05 | 0.05 | 0.05 | 0.05 |
| $RO/(RO + R_2O)$ | 0.28 | 0.24 | 0.28 | 0.28 |
| Low Temperature Coefficient of Thermal Expansion (ppm/° C.) | 7.34 | | | |
| High Temperature Coefficient of Thermal Expansion (ppm/° C.) | 17.74 | | | |
| Density (g/cm³) | 2.434 | 2.425 | 2.45 | 2.464 |
| Strain Point (° C.) | 601 | 615 | 619 | 597 |
| Anneal Point (° C.) | 654 | 671 | 675 | 650 |
| Softening Point (° C.) | 915 | 954 | 945 | 905 |
| Fictive Temperature $T_f$ (° C.) | 743 | 766 | 768 | 738 |
| Stress Optical Coefficient (SOC) (nm/mm/MPa) | 3.14 | 3.25 | 3.258 | 3.22 |
| Refractive Index | 1.5009 | 1.4953 | 1.5001 | 1.5034 |
| 200 Poise Temperature (° C.) | 1750 | 1799 | 1767 | 1752 |
| 35000 Poise Temperature (° C.) | 1240 | 1286 | 1261 | 1230 |
| 200000 Poise Temperature (° C.) | 1132 | 1178 | 1153 | 1123 |
| Liquidus viscosity (Poise) | 1,318,850 | 4,190,759 | 1,888,477 | 842,285 |
| Zircon breakdown viscosity (Poise) | <16,000 | <29,000 | <21,000 | <13,000 |

Example 2

Ion-Exchanged Glass Articles

Glass samples of each of exemplary Glass A-Glass J of Table 1 were chemically strengthened by ion-exchanged at 410° C. in 100% $KNO_3$ bath for 4 hours and 8 hours, respectively, to induce a compressive stress layer in the surface of the samples. The glass thickness ranged from 0.1 mm to 1.0 mm. The glasses were heat treated to set the fictive temperature equal to $10^{11}$ poises temperature. The properties of the ion-exchanged glasses were determined and described in Tables 2 and 3 below.

As shown in Table 2, the ion-exchanged glasses (0.4 mm thickness, ion-exchanged for 4 hours) had a surface compressive stress of at least 745 MPa and a depth of compression layer of at least 26 microns.

As shown in Table 3, the ion-exchanged glasses (0.4 mm thickness, ion-exchanged for 8 hours) had a surface compressive stress of at least 699 MPa and a depth of compression layer of at least 36 microns.

A skilled artisan would understand that shorter ion-exchanging time can be used to improve compressive stress, where greater surface strength of a glass based article is desirable. Conversely, longer ion-exchanging time can be used to increase the depth of compressive layer, where greater damage resistance of a glass based article is desirable.

TABLE 2

Ion-exchanged glasses with different thickness (ion-exchanged at 410° C. for 4 h in 100% $KNO_3$, and the glasses were heat treated to set the fictive temperature of $10^{11}$ poise temperature)

| Glass Composition | Glass A | Glass B | Glass C | Glass D | Glass E | Glass F | Glass G | Glass H | Glass I | Glass J |
|---|---|---|---|---|---|---|---|---|---|---|
| 1 mm thickness | | | | | | | | | | |
| Compressive Stress (MPa) | 825 | 807 | 783 | 779 | 788 | 789 | 809 | 776 | 841 | 807 |
| Depth of Compression (microns) | 35 | 36 | 36 | 37 | 30 | 26 | 36 | 54 | 45 | 36 |
| 0.4 mm thickness | | | | | | | | | | |
| Compressive Stress (MPa) | 792 | 774 | 751 | 748 | 757 | 757 | 777 | 745 | 807 | 775 |
| Depth of Compression (microns) | 35 | 36 | 36 | 37 | 30 | 26 | 36 | 54 | 45 | 36 |

TABLE 2-continued

Ion-exchanged glasses with different thickness (ion-exchanged at 410° C. for 4 h in 100% KNO₃, and the glasses were heat treated to set the fictive temperature of $10^{11}$ poise temperature)

| Glass Composition | Glass A | Glass B | Glass C | Glass D | Glass E | Glass F | Glass G | Glass H | Glass I | Glass J |
|---|---|---|---|---|---|---|---|---|---|---|
| 0.2 mm thickness | | | | | | | | | | |
| Compressive Stress (MPa) | 734 | 718 | 697 | 693 | 701 | 702 | 720 | 690 | 748 | 718 |
| Depth of Compression (microns) | 35 | 36 | 36 | 37 | 30 | 26 | 36 | 54 | 45 | 36 |
| 0.1 mm thickness | | | | | | | | | | |
| Compressive Stress (MPa) | 619 | 605 | 587 | 584 | 591 | 591 | 607 | 582 | 630 | 605 |
| Depth of Layer (microns) | ≥20 | ≥20 | ≥20 | ≥20 | ≥20 | ≥20 | ≥20 | ≥20 | ≥20 | ≥20 |

TABLE 3

Ion-exchanged glasses with different thickness (ion-exchanged at 410° C. for 8 h in 100% KNO₃, and the glasses were heat treated to set the fictive temperature of $10^{11}$ poise temperature)

| Glass Composition | Glass A | Glass B | Glass C | Glass D | Glass E | Glass F | Glass G | Glass H | Glass I | Glass J |
|---|---|---|---|---|---|---|---|---|---|---|
| 1 mm thickness | | | | | | | | | | |
| Compressive Stress (MPa) | 796 | 791 | 756 | 764 | 774 | 774 | 776 | 744 | 809 | 780 |
| Depth of Compression (microns) | 49 | 50 | 50 | 50 | 43 | 36 | 50 | 75 | 62 | 50 |
| 0.4 mm thickness | | | | | | | | | | |
| Compressive Stress (MPa) | 748 | 743 | 711 | 718 | 727 | 728 | 730 | 699 | 760 | 733 |
| Depth of Compression (microns) | 49 | 50 | 50 | 50 | 43 | 36 | 50 | 75 | 62 | 50 |
| 0.2 mm thickness | | | | | | | | | | |
| Compressive Stress (MPa) | 668 | 664 | 635 | 641 | 650 | 650 | 652 | 625 | 679 | 655 |
| Depth of Compression (microns) | 49 | 50 | 50 | 50 | 43 | 36 | 50 | 75 | 62 | 50 |
| 0.1 mm thickness | | | | | | | | | | |
| Compressive Stress (MPa) | 509 | 506 | 484 | 489 | 495 | 495 | 497 | 476 | 518 | 499 |
| Depth of Compression (microns) | ≥20 | ≥20 | ≥20 | ≥20 | ≥20 | ≥20 | ≥20 | ≥20 | ≥20 | ≥20 |

Example 3

The HTCTE was measured for Glass G as well as for the 10 reference glass compositions listed in Table 4 below. The HTCTE was measured as described above and the plot of the coefficient of thermal expansion (y axis) as a function of temperature (x axis) for Glass G and Reference Glass Compositions 1-10 is shown in FIG. 1. To obtain the curves shown in FIG. 1 the glasses we cooled at a rate of 2 degrees C. per second from 790 degrees C. to 400 degrees C. As can be seen in FIG. 1, Glass G has a lower HTCTE (the CTE value where the CTE plateaus).

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology

TABLE 4

| | Reference Glass Compositions | | | | | | | | | |
|---|---|---|---|---|---|---|---|---|---|---|
| Mol % | 1 | 2 | 3 | 4 | 5 | 6 | 7 | 8 | 9 | 10 |
| $SiO_2$ | 66.4 | 69.3 | 68.9 | 67.4 | 64.4 | 64.8 | 60.9 | 57.4 | 57.4 | 63.6 |
| $Al_2O_3$ | 10.3 | 8.5 | 10.3 | 12.7 | 14.0 | 13.9 | 15.4 | 16.5 | 16.1 | 15.6 |
| $B_2O_3$ | 0.6 | 0.0 | 0.0 | 3.7 | 7.0 | 5.1 | 0.0 | 0.0 | 0.0 | 0.0 |
| $P_2O_5$ | 0.0 | 0.0 | 0.0 | 0.0 | 0.0 | 0.0 | 4.9 | 6.5 | 6.5 | 2.5 |
| $Li_2O$ | 0.0 | 0.0 | 0.0 | 0.0 | 0.0 | 0.0 | 0.0 | 0.0 | 0.0 | 6.2 |
| $Na_2O$ | 13.8 | 13.9 | 15.2 | 13.7 | 14.0 | 13.7 | 15.8 | 16.7 | 17.1 | 10.8 |
| $K_2O$ | 2.4 | 1.2 | 0.0 | 0.0 | 0.5 | 0.0 | 0.0 | 0.0 | 0.0 | 0.0 |
| MgO | 5.7 | 6.4 | 5.4 | 2.4 | 0.0 | 2.4 | 2.9 | 2.8 | 2.8 | 0.0 |
| CaO | 0.6 | 0.5 | 0.0 | 0.0 | 0.0 | 0.0 | 0.0 | 0.0 | 0.0 | 0.0 |
| ZnO | 0.0 | 0.0 | 0.0 | 0.0 | 0.0 | 0.0 | 0.0 | 0.0 | 0.0 | 1.2 |
| $SnO_2$ | 0.2 | 0.2 | 0.2 | 0.1 | 0.1 | 0.1 | 0.1 | 0.1 | 0.1 | 0.1 | or phraseology of the present specification is to be interpreted by the skilled artisan in light of the teachings and guidance.

The breadth and scope of the present disclosure should not be limited by any of the above-described exemplary embodiments.

All of the various aspects, embodiments, and options described herein can be combined in any and all variations.

All publications, patents, and patent applications mentioned in this specification are herein incorporated by reference to the same extent as if each individual publication, patent, or patent application was specifically and individually indicated to be incorporated by reference.

What is claimed:

1. A glass composition comprising:
   72 mol % to 77 mol % $SiO_2$;
   8 mol % to 12 mol % $Al_2O_3$;
   10 mol % to 14 mol % of one or more alkali oxide $R_2O$, wherein $R_2O$ is $Na_2O$, $Rb_2O$, or $Cs_2O$;
   one or more divalent oxide RO, wherein RO is MgO, CaO, SrO, BaO, or ZnO;
   0.03 to 0.1 mol % $SnO_2$;
   and 0.01 mol % to 2 mol % $P_2O_5$;
   wherein the ratio of mol % RO/(mol % $R_2O$+mol % RO) is at least 0.24; and
   wherein the glass composition is substantially free of $K_2O$, $B_2O_3$, and $Li_2O$.

2. The glass composition of claim 1, comprising:
   72 mol % to 75 mol % $SiO_2$;
   9 mol % to 11 mol % $Al_2O_3$; and
   11 mol % to 13 mol % $Na_2O$.

3. The glass composition of claim 1, further comprising from 0.03 mol % to 4 mol % ZnO.

4. The glass composition of claim 1, comprising:
   0.03 mol % to 4 mol % MgO;
   0.03 mol % to 5 mol % CaO; and
   0.03 mol % to 4 mol % ZnO.

5. The glass composition of claim 4, comprising:
   0.05 mol % to 3 mol % MgO;
   0.05 mol % to 4 mol % CaO; and
   0.03 mol % to 3 mol % ZnO.

6. The glass composition of claim 1, comprising:
   0.03 mol % to 0.08 mol % $SnO_2$.

7. The glass composition of claim 1, wherein the ratio of mol % RO/(mol % $R_2O$+mol % RO) is in a range from 0.24 to 0.5.

8. The glass composition of claim 1, wherein the glass composition has one or more of the following characteristics: (i) a low temperature coefficient thermal expansion (LTCTE) of less than 7.5 ppm/° C.; (ii) a high temperature coefficient thermal expansion (HTCTE) of less than 18 ppm/° C.; (iii) a liquidus viscosity of at least 200,000 poise; (iv) a glass temperature of at least 1100° C. at 200,000 poise or at least 1200° C. at 35,000 poise; and (v) a fictive temperature $T_f$ less than 795° C.

9. The glass composition of claim 1, which is ion-exchange strengthened.

10. The glass composition of claim 9, which has: (1) a depth of a compressive layer of at least 10 microns; and/or (2) a compressive strength of at least 450 MPa.

11. The glass composition of claim 9, which has: (i) a depth of compressive layer from 15 to 100 microns; and/or (2) a compressive strength of from 550 MPa to 650 MPa.

12. A glass based article comprising the composition of claim 1.

13. The glass based article of claim 12, which has a thickness of up to 3 mm.

14. The glass based article of claim 13, wherein the article is a consumer electronic device comprising:
   a housing having a front surface, a back surface and side surfaces;
   electrical components provided at least partially within the housing, the electrical components including at least a controller, a memory, and a display, the display being provided at or adjacent the front surface of the housing;
   a force sensor; and
   a substrate comprising comprises a glass composition of claim 1 disposed over the display.

15. A glass composition comprising:
   72 mol % to 77 mol % $SiO_2$;
   8 mol % to 12 mol % $Al_2O_3$;
   10 mol % to 14 mol % of one or more alkali oxide $R_2O$, wherein $R_2O$ is $Na_2O$;
   0.03 mol % to 4 mol % MgO;
   0.03 mol % to 5 mol % CaO;
   up to 4 mol % ZnO;
   0.03 mol % to 2 mol % $P_2O_5$; and
   0.03 mol % to 0.09 mol % $SnO_2$, wherein the ratio of mol % RO/(mol % $R_2O$+mol % RO) is in a range from 0.24 to 0.5 RO being MgO, CaO, and ZnO;
   wherein the glass composition is substantially free of $K_2O$, $B_2O_3$, and $Li_2O$.

16. The glass composition of claim 15, comprising:
   72.17 mol % to 74.37 mol % $SiO_2$;
   7.95 mol % to 10.04 mol % $Al_2O_3$;
   15.59 mol % to 12.69 mol % $Na_2O$;
   0.05 mol % to 3.08 mol % MgO;
   0.03 mol % to 4.04 mol % CaO;
   up to 2.94 mol % ZnO;
   0.03 mol % to 0.96 mol % $P_2O_5$; and
   0.05 mol % to 0.07 mol % $SnO_2$.

17. The glass composition of claim 15, wherein the glass composition has one or more of the following characteristics: (i) a low temperature coefficient thermal expansion (LTCTE) of less than 7.5 ppm/° C.; (ii) a high temperature coefficient thermal expansion (HTCTE) of less than 18 ppm/° C.; (iii) a liquidus viscosity of at least 200,000 poise; (iv) a glass temperature of at least 1100° C. at 200,000 poise or at least 1200° C. at 35,000 poise; and (v) a fictive temperature Tf less than 795° C.

18. The glass composition of claim 15, which is ion-exchange strengthened.

19. The glass composition of claim 18, which has: (1) a depth of a compressive layer of at least 10 microns; and/or (2) a compressive strength of at least 450 MPa.

20. The glass composition of claim 18, which has: (1) a depth of compressive layer from 15 to 100 microns; and/or (2) a compressive strength of from 550 MPa to 650 MPa.

21. A glass based article comprising the composition of claim 15.

22. The glass based article of claim 21, which has a thickness of up to 3 mm.

23. The glass based article of claim 21, wherein the article is a consumer electronic device comprising:
   a housing having a front surface, a back surface and side surfaces;
   electrical components provided at least partially within the housing, the electrical components including at least a controller, a memory, and a display, the display being provided at or adjacent the front surface of the housing;

a force sensor; and
a substrate comprising comprises a glass composition of claim 10 disposed over the display.

\* \* \* \* \*

UNITED STATES PATENT AND TRADEMARK OFFICE
CERTIFICATE OF CORRECTION

PATENT NO.        : 10,899,653 B2
APPLICATION NO.   : 15/863054
DATED             : January 26, 2021
INVENTOR(S)       : Timothy Michael Gross Page 1 of 1

It is certified that error appears in the above-identified patent and that said Letters Patent is hereby corrected as shown below:

On the Title Page

In Column 2, item (56), Other Publications, Line 21, delete ""Distrbution" and insert -- "Distribution --, therefor.

In Column 2, item (56), Other Publications, Line 22, delete "oxgen" and insert -- oxygen --, therefor.

In Column 2, item (56), Other Publications, Line 23, delete "Glassa," and insert -- Glasses, --, therefor.

In Column 2, item (57), Abstract, Line 9, delete "(form" and insert -- (from --, therefor.

In the Claims

In Column 17, Line 61, Claim 11, delete "(i)" and insert -- (1) --, therefor.

In Column 18, Line 25, Claim 15, delete "0.5" and insert -- 0.5, --, therefor.

In Column 18, Line 30, Claim 16, delete "7.95" and insert -- 9.95 --, therefor.

In Column 18, Line 31, Claim 16, delete "15.59" and insert -- 10.59 --, therefor.

In Column 18, Line 46, Claim 17, delete "Tf" and insert -- $T_f$ --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*